Nov. 14, 1961  S. DARLINGTON  3,008,668
GUIDANCE CONTROL SYSTEM
Filed June 6, 1955  5 Sheets-Sheet 1
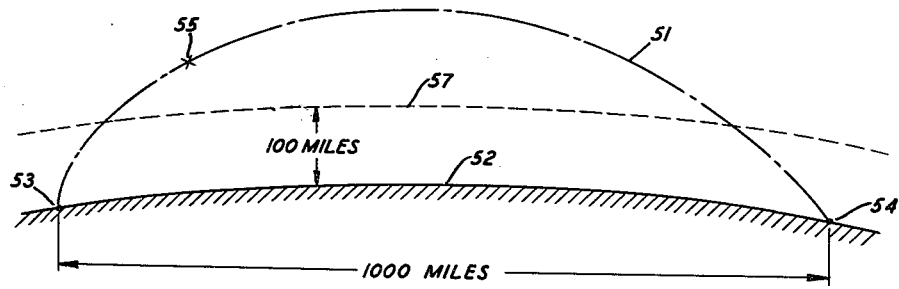
FIG. 1
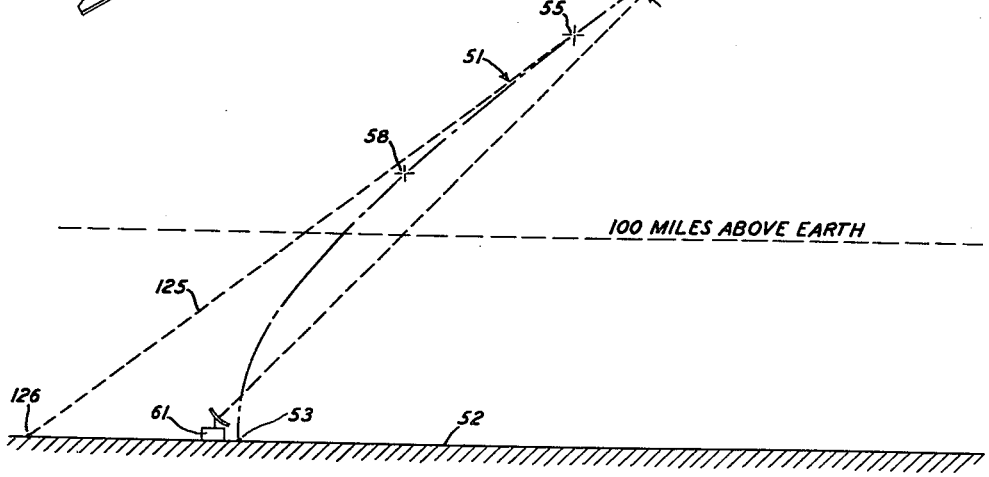
FIG. 3
FIG. 2
INVENTOR
S. DARLINGTON
BY
H. O. Wright
ATTORNEY INVENTOR
S. DARLINGTON
BY
H. O. Wright
ATTORNEY Nov. 14, 1961 S. DARLINGTON 3,008,668
GUIDANCE CONTROL SYSTEM
Filed June 6, 1955 5 Sheets-Sheet 3

INVENTOR
S. DARLINGTON
BY
H. O. Wright
ATTORNEY

Nov. 14, 1961  S. DARLINGTON  3,008,668
GUIDANCE CONTROL SYSTEM
Filed June 6, 1955  5 Sheets-Sheet 4
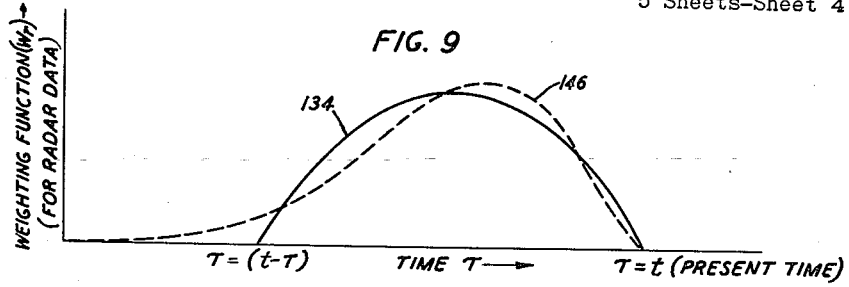
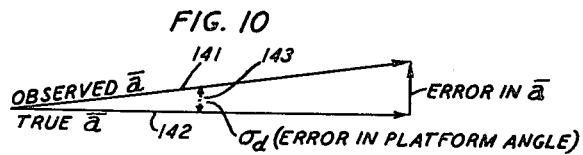
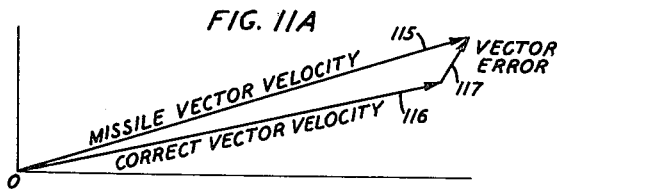
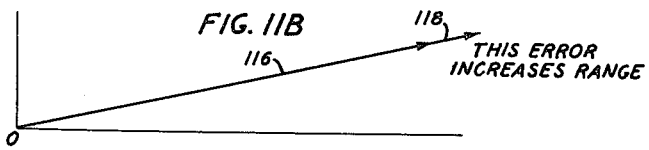
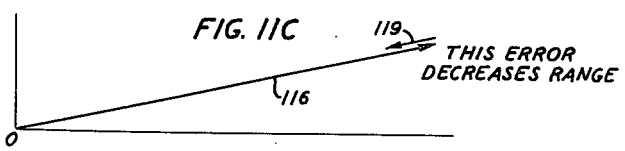
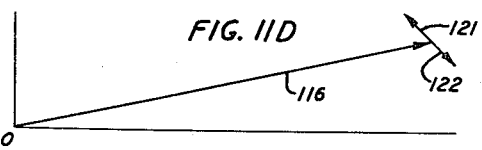
INVENTOR
S. DARLINGTON
BY
H. O. Wright
ATTORNEY

United States Patent Office 3,008,668
Patented Nov. 14, 1961

3,008,668
GUIDANCE CONTROL SYSTEM
Sidney Darlington, Passaic Township, Morris County, N.J., assignor to Bell Telephone Laboratories, Incorporated, New York, N.Y., a corporation of New York
Filed June 6, 1955, Ser. No. 513,309
19 Claims. (Cl. 244—14)

This invention relates to guidance systems, and more particularly to such systems for use with long range ballistic missiles or rocket ships.

Long range ballistic missiles are characteristically powered by reaction type motors such as rockets or ramjets, for example, for part of their trajectories. Because the reaction type motors have significant variations in the magnitude and direction of their thrust, a control system is required to steer the missile and to cut off the power plant when the proper velocity has been attained.

Rockets have been employed heretofore at moderately long ranges for the projection of warheads to distant targets. For example, the Germans launched V–2 rockets from France to targets in England which were approximately two hundred miles away. These rockets had only rudimentary guidance systems, however, and were notoriously inaccurate. Their average impact error amounted to several miles. In the years since World War II, there had been considerable improvement in missile guidance. This has been offset, however, by the greatly increased ranges now required, for which much better guidance is needed even to achieve the same accuracy. No rockets are known at the present time which are capable of ranges of 1,000 miles or more, with average impact point errors less than several miles.

Accordingly, an important object of the present invention is to increase the accuracy of long range ballistic missiles.

A critical factor in the guidance of a long range rocket is the accurate determination of the velocity and position of the rocket during the initial phases of its flight. If the velocity and position of the rocket are accurately determined, control information can readily be issued to the rocket to compensate for deviations from the desired trajectory. However, substantial errors are normally present in the instantaneous indications of the instruments which are employed to determine the velocity and position of the rocket.

A collateral object of the present invention is, therefore, to improve the accuracy of the position and velocity determinations.

The accuracies of the position and velocity determinations depend on the accuracies of the information collecting or sensing instruments, such as radars, and also on the processing of the information collected by the sensing instruments. Accuracy requirements on velocities are much harder to achieve than accuracy requirements on positions corresponding to the same overall guidance accuracy. A critical step in the information processing is the formation of weighted averages of apparent velocities, for the purpose of smoothing out fluctuations resulting from sensing instrument errors. Improvements in velocity determinations may be used either to improve the accuracy of the rocket system or to permit the use of simpler, less accurate sensing instruments.

Rocket guidance systems proposed heretofore have combined rudimentary smoothing with information collection of such high accuracy that the information collecting instruments have been extremely complicated and even of doubtful feasibility. For example, one proposed method for reducing errors in velocities is known as memory point smoothing. To determine velocity by the memory point smoothing method, the position of the rocket at a first time is subtracted from the rocket position at a later time. The average velocity is obtained by dividing the difference of position by the time between measurements. The flat average of the memory point smoothing method reduces velocity errors to some extent, but the velocity is still far more inaccurate than is necessary with the same accuracy of the information supplied by the sensing instruments.

A further object of the present invention is, therefore, to improve the processing of the information supplied by the sensing instruments, in guidance control systems.

In accordance with an important aspect of the present invention, the velocity of a rocket or other moving object is calculated from data supplied by two instrumentalities which independently determine the position and the acceleration, respectively, of the moving object. The two instrumentalities, when used together, may each have a much lower accuracy than if used alone, with no loss of guidance accuracy. In a preferred form of the invention, position is determined by a tracking system located on the ground, and acceleration is determined by an inertial system including accelerometers and a stable platform or other direction reference in the rocket. The information collected by the two information collection systems is processed by a computing system. In the computer, the information collected over an optimum time interval is smoothed, using appropriate weighting functions, and is then combined to yield a desired function of the computed velocity.

The sensitivity of the computer velocity to errors in the sensing instruments depends on both the length of the smoothing interval and on the form of the weighting functions. The computed velocity using the arrangements of the present invention is substantially less sensitive to errors in the sensing instruments than comparable prior art arrangements in which relatively rudimentary smoothing is used. The extent of the improvement depends on statistical characteristics of the sensing instrument errors. Representative reductions in sensitivity are greater than two to one.

Rockets are normally brought up to speed by one or more stages of rocket propulsion, after which they continue on their trajectories in free flight. A feature of the invention involves the use of at least one vernier, or low thrust, stage following the initial high thrust power stage. This has the effect of reducing the errors in the accelerometer indications and thus improving the accuracy of the two instrumentality control systems.

Three other important factors are (1) the path, or trajectory of the rocket from the launching site to the point at the end of the propulsion phase or phases where the rocket starts its free flight; (2) the free flight path, or trajectory of the rocket from said end point of the propulsion phase to the target; and (3) the location of the radar, or other radio position and velocity measuring means, with respect to the rocket launching site. Any of many different trajectories may be used during the propulsion phase, by suitable operation of the steering means. Of these, preferred trajectories are those which require less fuel to achieve a given velocity at the beginning of the free flight trajectory.

In high school physics, students are taught that an object (such as a ball) will travel the maximum horizontal distance before striking the ground if it is projected at an angle of 45 degrees with the horizontal (assuming a fixed initial velocity and neglecting air resistance and curvature of the earth). Similar optimum trajectories may be computed in accordance with known means for any desired distance between the point where the rocket starts its free flight trajectory and the target. The rocket will follow any of various free flight trajectories between the starting point and the target if its initial velocity is properly adjusted to the requirements of the particular trajectory. A particular one of these trajectories requires a minimum value of the initial velocity, and is commonly preferred for reasons of fuel economy. In contrast with the simple parabolic trajectory of the ball thrown at a 45 degree angle in the example mentioned above, the "minimum velocity" free flight trajectory of a rocket is complicated by the curvature of the earth and the high altitude of the initial point in comparison with that of the target.

At the point where the rocket starts its free flight trajectory, it is desirable that its vector velocity shall correspond to a computed vector velocity required for the rocket to hit a distant target. Slight errors in the magnitude of direction of the rocket vector velocity may result in missing the target by a large distance. The errors in magnitude and direction determine vector errors in the rocket vector velocity. An important characteristic of rocket trajectories is that velocity vector errors in some directions affect the impact point error at the target more than vector errors in other directions. Corresponding to any particular trajectory, the impact point error is most sensitive to velocity vector errors in a particular direction. For the minimum velocity trajectory, the direction of maximum impact point sensitivity is a tangent to the trajectory.

As mentioned above, the information collection systems which have been proposed for long range rocket systems have ben exceedingly complex and expensive. For example, typical proposed systems for collecting rocket position data have employed a combination of several radars spaced by distances of many miles, or a complicated doppler and radio interferometer system.

Accordingly, still another obect of the present invention is to reduce the cost of position determining equipment and to improve the effectiveness of the position sensing equipment which is employed.

When range (or distance) and angle errors are compared on the basis of corresponding vector errors in vector position, tracking systems are usually more accurate in determining ranges than angles. Higher accuracy in angle directions has been specified in some rocket guidance systems proposed heretofore, but this specification has substantially increased the complexity and cost of the tracking system. Thus, with the usual type of tracking system, rocket vector velocity errors along the line of sight between the radar system and the rocket may be more readily determined, and therefore kept substantially smaller, than velocity vector errors in other directions. In accordance with another aspect of the invention, errors at the target are substantially reduced by aligning the direction of greatest impact point sensitivity of the rocket with the line of sight between the tracking system and the rocket during the final period when rocket control information is being obtained.

In various rocket systems proposed heretofore, part or all of the tracking system has been situated many miles from the launching site. A tracking system which is located reasonably close to the launching site has great advantages, however, regarding logistics, mobility, reliability and other matters. When the tracking system is in the neighborhood of the launching site, alignment of the direction of greatest impact point sensitivity and the sight line from tracking system to rocket poses additional problems. More specifically, if the minimum velocity free flight trajectory is employed, alignment of the direction of greatest sensitivity and a sight line from near the launching site, at the end of the interval in which position information is collected, requires that the free flight trajectory must be substantially tangent to said sight line. This condition restricts the choice of the propulsion phase trajectory, in a way which increases the amount of fuel which must be used to achieve a given free flight velocity.

Therefore, an additional obect of the present invention is to improve the accuracy of rocket systems in which the tracking system is located at the rocket launching site.

This additional object is accomplished by the use of a free flight trajectory which is appropriately flattened as compared with the minimum velocity trajectory. It has been discovered that this has the effect of elevating the direction of greatest impact point sensitivity of the rocket. The tracker-to-rocket sight line is then colinear with the direction of greatest sensitivity during the interval when the final rocket control information is being collected, and this sight line intersects the free flight trajectory at an angle, rather than being tangent thereto. This permits the choice of a propulsion phase trajectory such that the fuel is used more efficiently. A free flight trajectory which is somewhat flatter than the minimum velocity free flight trajectory through the same initial point requires a slightly higher initial velocity. A flattening of the initial slope of the trajectory by as much as 5 degrees, however, increases the required velocity by only about one-half of one percent.

Other objects and various additional features and advantages of the invention will become apparent by reference to the following detailed description taken in connection with the accompanying drawings, and from the appended claims.

In the drawings:

FIG. 1 shows a typical trajectory for a rocket having a range of approximately 1,000 miles;

FIG. 2 is an enlarged portion of the initial phases of the rocket trajectory shown in FIG. 1;

FIG. 3 is a view of a rocket in which the principal reference axes for rocket control purposes are shown;

FIG. 9 is a plot of the response characteristic of the circuit of FIG. 7 as compared with the weighting factor shown in FIG. 5;

FIG. 10 is a vector diagram indicating the advantages of employing a low thrust rocket phase;

FIGS. 11A through 11D illustrate the effect of vector velocity errors in different directions;

Figure 4:
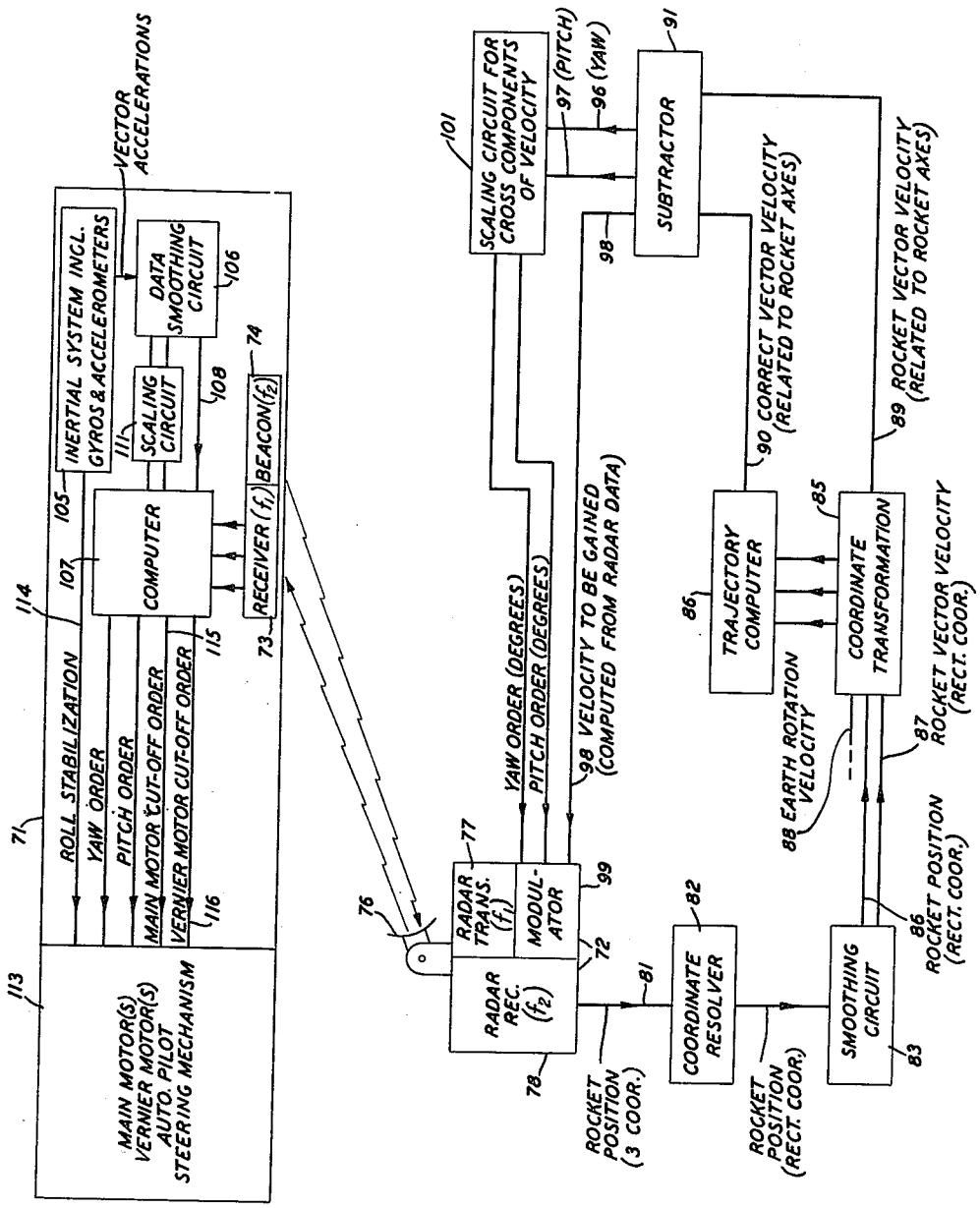
FIG. 4 is a schematic block diagram of a rocket control system illustrating the principles of the present invention.

Referring more particularly to the drawings, FIG. 1 shows, by way of example and for purposes of illustration, a complete trajectory of a long range rocket. The rocket trajectory 51 is shown with respect to the earth's surface 52 for a rocket having a range of approximately 1,000 miles. The rocket is launched at point 53, and the impact point of the missile is at point 54. The rocket is powered during the initial stages of its flight, and the approximate power cut-off point is indicated by point 55 on the trajectory 51. In FIG. 1, the dashed line 57 is drawn in at an elevation of 100 miles above the earth's surface 52 to indicate in a very general way the point where atmospheric resistance ceases. It may therefore be observed that the principal portion of the rocket flight will be essentially in free space.

FIG. 2 shows an enlarged view of the initial portion of the rocket trajectory of FIG. 1. In FIG. 2, the vertical launching path of the rocket is shown more clearly. This vertical path is desirable for maintaining rocket stability at the low initial velocities characteristic of fuel laden rockets. After full motor thrust is attained, however, the rocket path curves gradually in the direction of the desired impact point.

In FIG. 2, the launching site is designated 53, and the principal power phase of the rocket trajectory extends to point 58. At this point, the main rocket motor or motors are cut off, and a vernier or low thrust phase begins. During this vernier phase, which extends from point 58 to point 55 in FIG. 2, the rocket is accelerating at a lower rate and more accurate rocket control information can be obtained, as will be disclosed in greater detail hereinafter. If desired, a sub-vernier phase may be provided from points 55 to 59 in the rocket trajectory. In this phase, even lower thrust would be applied to the rocket, and final trajectory corrections would be effected.

A radar system 61 is located at the rocket launching site 53 in FIG. 2. The location of the radar system at the launching site is desirable in order to avoid problems of communication and data transmission, and to increase the tactical mobility of the entire rocket launching and control system.

FIG. 3 is a view of the rocket in which the principal reference axes of the rocket are shown. The physical axis 63 through the center of the rocket 71 is naturally the principal direction of motion of the rocket. The pitch axis 64 is parallel to the ground and perpendicular to the axis 63. Errors in pitch are determined in terms of rotation about the pitch axis 64. The yaw axis 65 is perpendicular to the other two axes 63 and 64. As in the case of the pitch axis, errors in yaw angle are determined in terms of rotation about the yaw axis 65.

FIG. 4 is a schematic diagram of the equipment required in the rocket and on the ground for one illustrative realization of the present invention. The rocket 71 (shown as a box in FIG. 4) is assumed to be at a point in its trajectory where it is still under control of radar signals from the ground. The radar unit 72 is located at the launching site of the rocket and may, for example, be separated by several hundred miles from position of the rocket 71 in its trajectory. The radar unit 72 may be of the type which is described in three companion articles in "Electronics" magazine. These articles are all entitled "The SCR 584 Radar" and appeared at page 104 et seq. of the November 1945 issue, at page 104 et seq. of the December 1945 issue and at page 110 et seq. of the February 1946 issue of "Electronics." However, because of the extreme ranges which must be employed in the present system, it is desirable that the radar system be employed as part of a radar beacon system. Radar beacon systems are disclosed in detail in a book entitled "Radar Beacons" by Arthur Roberts, which is volume III of the Radiation Laboratories Series, McGraw-Hill Book Company, New York, 1947.

A radar beacon system includes both a radar receiver 73 and beacon unit 74 located in the rocket, in addition to the radar system 72 located on the ground. When signals from the ground radar unit 72 are received at the rocket, the beacon 74 is triggered and transmits a return impulse which is picked up by the directional antenna 76 of the radar unit 72. The SCR 584 radar set mentioned hereinabove may be modified for beacon use by tuning the radar transmitter 77 to one frequenecy ($f_1$) and the associated receiver 78 to another frequency ($f_2$). The receiver 73 and the beacon 74 in the rocket 71 are, of course, also tuned to frequencies $f_1$ and $f_2$, respectively.

The radar receiver transmits the rocket position data along channel 81 to the coordinate resolver 82. The coordinate resolver 82 may be of the type disclosed in C. A. Lovell et al., Patent 2,408,081 granted September 24, 1946. Resolver 82 transforms the position data from the radar receiver into rectangular coordinates. The information from the coordinate resolver 82 is applied to the smoothing circuit 83 which will be described in substantial detail hereinafter. It may be noted, however, that the smoothing circuit may be of the type described in H. W. Bode Patent 2,492,351 granted December 27, 1949 or in R. L. Dietzold Patent 2,549,065 granted April 17, 1951. In the smoothing circuit 83 the rate of change of position with time is computed. The position and vector velocity data from the smoothing circuit 83 is transmitted to the coordinate transformation circuit 85. The coordinate transformation circuit 85 may, for example, be implemented as indicated at pages 279 through 287 of a book entitled "Electronic Analog Computers" by G. A. Korn and T. M. Korn, McGraw-Hill Book Co., Inc., New York, 1952. In addition to the rocket position and rocket vector velocity which are supplied on circuits 86 and 87, respectively, the coordinate transformation circuit 85 is supplied with earth rotation velocity data on lead 88. The coordinate transformation circuit 85 refers the rocket position and vector velocity data to the instantaneous position of the rocket. Information from the coordinate transformation circuit 85 is supplied to the trajectory computer 86. The trajectory computer 86 may be of any known form of high speed computer which is capable of solving the required trajectory problem. The overall problem which is solved by the computer is the determination of the vector velocity of the rocket required to hit the distant target, with no further propulsion or steering. The trajectory equation in terms of the fixed (nonrotating) coordinates of the rocket is as follows:

$$V^2=\left(\frac{2K}{r_1}\right)\frac{1-\cos \rho}{\left(\frac{r_1}{r_2}-\cos \rho\right)(1+\cos 2\gamma_1)+\sin \rho \sin 2\gamma_1} \quad (1)$$

where V is the velocity of the rocket in its initial position at the present time,
$\rho$ is the great circle range in degrees from the present position of missile to the impact point,
$r_1$ and $r_2$ are the height above the center of the earth of the rocket and impact point, respectively,
$\gamma_1$ is the initial slope of the rocket trajectory, and K is a gravitational constant which is equal to the force of gravity at the earth's surface times the square of the radius of the earth.

In the determination of the velocity required to hit the target, a method of successive approximations is employed. The steps in the determination of the required velocity are as follows:

(a) The vector velocity of the rocket relative to the earth required for a hit is carried over from the previous calculation.

(b) The remembered velocity (a) is corrected for the tangential velocity of the earth to obtain the velocity relative to the nonrotating coordinates of the rocket.

(c) The trajectory Equation 1 is solved for $\rho$, using the velocity approximation as determined in (b), and the present position and slope of the trajectory of the rocket.

(d) The remaining time of flight is determined.

(e) The actual value of $\rho$ measured on the earth's surface is corrected for rotation of the earth during the remaining time of flight of the rocket, and is thus translated into the nonrotating coordinates of the rocket.

(f) The values of $\rho$ determined at (c) and (e) are compared, and the approximate value of the velocity as determined at (b) is corrected to reduce or eliminate the difference between the two values of $\rho$.

The output lead 89 from the coordinate transformation circuit 85 transmits the rocket vector velocity data referred to the axes of the rocket to the subtracter 91. The output 90 from the trajectory computer 86 transmits information indicating the vector velocities of the rocket required for zero impact point errors. In the subtracter 91, the rocket vector velocity as computed from radar data is subtracted from the required vector velocities.

As shown in FIG. 3, the three reference axes of the rocket are the yaw axis 65, the pitch axis 64, and the principal direction of motion of the rocket, which is identified as axis 63. The information applied to the subtracter 91 of FIG. 4 is referred to these axes of the rocket. The output of the subtracter 91 is shown in FIG. 4 in terms of its three components; the velocity to be gained referred to the yaw axis appears on lead 96; the velocity to be gained referred to the pitch axis appears on lead 97; and the velocity to be gained along the principal direction of motion of the rocket appears on lead 98. The last-mentioned signal on lead 98 is transmitted directly to the modulator 99 of the radar unit 72 for transmission to the rocket 71. The velocity to be gained in the yaw and pitch directions, however, are applied to the scaling circuit 101. In the scaling circuit 101, the cross-components of the velocity are transformed into yaw and pitch orders in terms of degrees of deflection required of the rocket from reference directions established by a stable platform located in the rocket. This information is applied to the modulator 99, and is also transmitted to the rocket 71.

As mentioned above, it is very important that the rocket has exactly the proper velocity and direction at the time the power is cut off. Otherwise, the rocket will, of course, miss the target by many miles. The purpose of data smoothing is to obtain accurate velocities from the radar data. The data supplied directly by the radar represents only positions. By mathematically differentiating the position data (or obtaining the slope of the position versus time plot) the corresponding velocities may be obtained. However, radar position information includes errors which fluctuate at unfortunate frequencies from the standpoint of velocity determinations. If the position information is merely differentiated, very large fluctuating errors in the velocity are obtained. These errors correspond to the time rate of change of position errors. The purpose of data smoothing is to reduce these fluctuations to tolerable bounds.

A simple type of data smoothing, and one which has been used frequently heretofore in anti-aircraft fire control systems, is termed "memory point smoothing." In "memory point smoothing" the position of the missile is noted at two spaced times. By taking the difference in position and dividing by the time, the average velocity of the missile in going between the two points will be obtained. This is a flat average, and depends upon only two measurements. Greater accuracy is obtained when more measurements are employed so that the errors will tend to cancel out.

If the velocity of the missile is constant, the average velocity will be the same as the velocity at the end of the averaging interval, which may be thought of as present time. If the velocity is not constant, that is, if the missile accelerates or decelerates during the smoothing interval, the present velocity will be different from the average velocity.

Referring once more to FIG. 4, the rocket control system includes the inertial system 105 located in the rocket. This inertial system 105 includes a stable platform which is held in a fixed position relative to the ground by a gyroscopic arrangement. Mounted on the stable platform are three accelerometers which may, for example, indicate acceleration in each of three reference directions relative to the stable platform by combinations of weights operating against the force of springs. These reference directions may be substantially coincident with the reference directions of the rocket during the final period when rocket control information is being obtained.

The difference between the average velocity as determined by the smoothing circuit 83 and the other equipment located on the ground, and the true present velocity of the rocket, is determined by the acceleration which takes place during the smoothing interval. The vector accelerations are indicated by the inertial system 105 in the rocket 71, and this information is combined in the computer 107 with the data received from the radar transmitter 77. The information from the inertial system 105 is applied to the data smoothing circuit 106, which is mathematically related to the smoothing circuit 83 in a manner which will be described in detail hereinafter. The velocity correction in the principal direction of motion of the rocket 71 is applied to the computer 107 by lead 108. The acceleration corrections for the yaw and pitch directions are transmitted to a scaling circuit 111 and are then applied to the computer 107.

The rear section 113 of the rocket 71 includes the main motor or motors, the vernier motor or motors, the autopilot, and a steering mechanism for the rocket. The rocket may, for example, have one main motor and two vernier motors. The vernier motors may be employed concurrently with the main motor during the initial main power phase of the rocket trajectory; and they may remain energized after the main motor is cut off, during the vernier power phase.

The rocket may be steered by any suitable method. For example, the two vernier motors may be swiveled; or fins may be employed to direct the rocket blast in the desired direction. Rotation of the rocket about its longitudinal axis is prevented by the autopilot in compartment 113. As the rocket starts to rotate about its longitudinal axis, an electromechanical transducer coupled to the stable platform in the inertial system 105 is energized. The electrical signal developed by the transducer is transmitted to the autopilot on lead 114, where it is amplified and applied to a servo motor which drives the steering mechanism. When the axial position of the rocket is restored to normal, the output of the electromechanical transducer is reduced to zero, and controlled rotation of the rocket about its axis stops.

The yaw and pitch orders are transmitted from the computer 107 to the autopilot in section 113 of the rocket in terms of degrees of deflection of the missile axis relative to the stable platform. The autopilot receives this information and operates the steering mechanism of the rocket to accomplish the required deflection of the rocket position.

Two additional leads 115 and 116 from the computer 107 to the compartment 113 control the main motor and the vernier motors. The computer 107 receives information from the computer circuits on the ground indicating the velocity to be gained before the rocket is to enter the free flight phase of its trajectory. The computer 107 also receives information on lead 108 from the inertial system 105, which is employed to bring the velocity information from the ground system up to date. When the velocity to be gained reaches a predetermined small amount, the computer energizes the main motor cut-off order lead 115, and the rocket enters the vernier thrust phase. When the rocket reaches the velocity which is required to hit the distant target, the computer 107 energizes the vernier motor cut-off lead 116, and the rocket power is completely cut off.

The nature of the smoothing circuits 83 and 106 is most important. It is by the proper selection of the characteristics of these circuits that impact point errors may be reduced substantially as compared with prior art systems using less sophisticated forms of smoothing.

Figure 5:
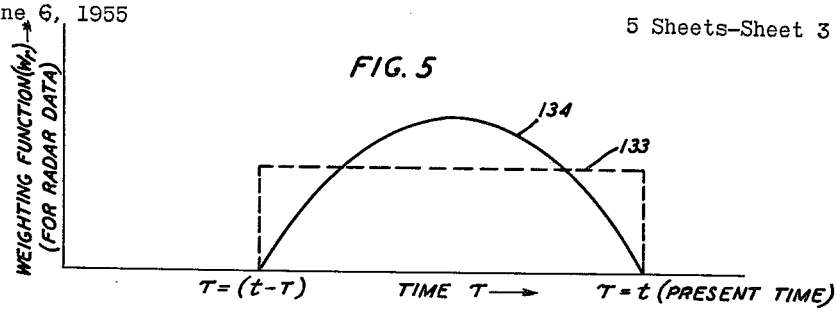
FIGS. 5 and 6 illustrate weighting characteristics of smoothing circuits which are employed in the system of FIG. 4.
Figure 6:
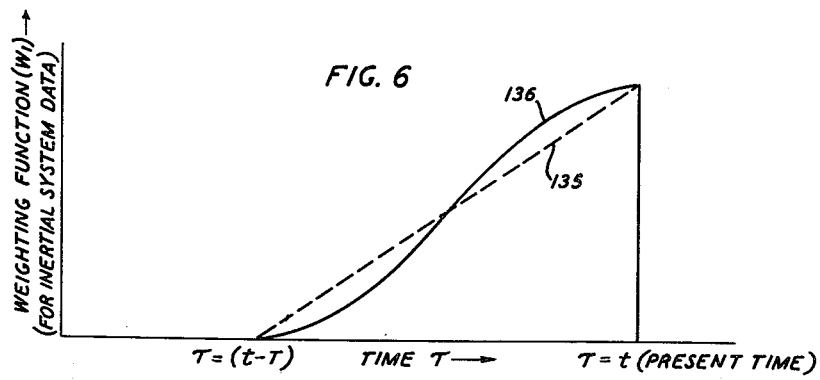

FIGS. 5 and 6 illustrate an idealized weighting factor versus time characteristic for one form of the smoothing circuits 83 and 106, respectively, of FIG. 4. In FIG. 5, the dotted line 133 indicates a flat memory point smoothing characteristic, and the solid line 134 indicates the type of smoothing which is used in the present system. With radar data being supplied regularly to the input of the smoothing network 83, the output will be equal to:

Velocity by radar (smoothed)

$$V(t)_r = \int_{t-T}^{t} W_r(t,\tau) x(\tau) d\tau \qquad (2)$$

where $t$ is the present time for which the velocity is computed,
$t-T$ is the time at the beginning of the smoothing interval,
$\tau$ is the time at which position $x$ is observed,
$x(\tau)$ is the apparent velocity at time $\tau$ corresponding to the rate of change of $x$, supplied by the radar, and
$W_r(t,\tau)$ is a weighting factor which starts at a low value at time $t-T$, rises to a maximum, and drops to a moderately low value at the present time $t$.

FIG. 6 illustrates one form of the weighting characteristic of the smoothing circuit 106 in the rocket. The dotted line 135 illustrates memory point smoothing, while the S-shaped characteristic 136 represents one form of smoothing in accordance with the present invention. The expression for the velocity correction supplied by the inertial system is:

Velocity correction by inertial system (smoothed)

$$V(t)_i = \int_{t-T}^{t} W_i(t,\tau)a(\tau)d\tau \qquad (3)$$

where $t$, $T$ and $\tau$ correspond to the similar designations in Expression (2),
$a(\tau)$ is the apparent acceleration at time $\tau$ supplied by the inertial system, and
$W_i(t,\tau)$ is the weighting factor for the acceleration data in the interval between $t-T$ and $t$.

In order for the velocity correction $V(t)_i$ to be equal to the difference between the average velocity $V(t)_r$ determined by the radar and the present velocity, the weighting factor $W_i(t,\tau)$ must have the following value:

$$W_i(t,\tau) = 1 - \int_{\tau}^{t} W_r(t,\tau_1)d\tau_1 \qquad (4)$$

Accordingly, the complete expression for the present velocity is as follows:

$$V(t) = \int_{t-T}^{t} \left[ W_r(\tau)\frac{dx(\tau)}{d\tau} - \left[ 1 - \int_{\tau}^{t} W_r(\tau_1)d\tau_1 \right] a(\tau) \right] d\tau \qquad (5)$$

In Expressions 4 and 5 $\tau_1$ represents time, and the subscript "1" indicates that $\tau_1$ is the variable of integration associated with $W_r(\tau_1)$. Expression 5 also clearly brings out the point that the smoothing interval T is the same for both smoothing circuits 83 and 106 of FIG. 4.

The Function 5 is also subject to the following condition:

$$\int_{t-T}^{t} W_r(\tau)d\tau = 1 \qquad (6)$$

This fixes the scale factor for the weighting functions 134 and 136 of FIGS. 5 and 6, respectively.

Figure 7:
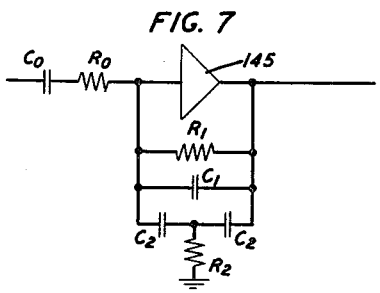
FIGS. 7 and 8 are representative circuits which may be used to approximate the weighting parameters of FIGS. 5 and 6, respectively.
Figure 8:
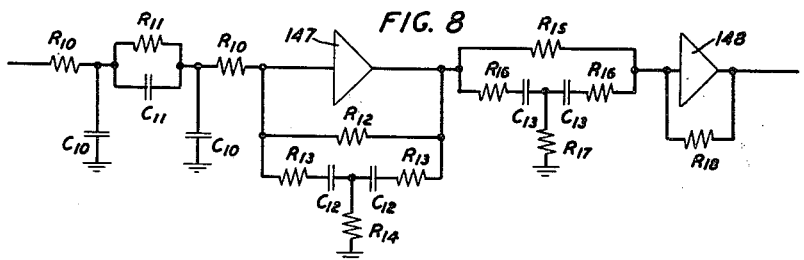

A method of realizing smoothing networks such as those indicated at 83 and at 106 in FIG. 4 is indicated in R. L. Dietzold Patent 2,549,065 granted April 17, 1951. In view of the importance of the smoothing circuits of the present invention, however, specific realizations of the circuits indicated by the boxes 83 and 106 of FIG. 4 are shown in FIGS. 7 and 8, respectively. The circuit of FIG. 7 may be replaced by a digital equivalent if the ground based computer is digital.

The networks of FIGS. 7 and 8 are developed by setting up an expression which approximates the desired weight function characteristic as closely as is required in a form which is known to be realizable as an electrical network. The actual values of the components of the electrical network are then worked out in a known manner.

In the case of the smoothing network 83, a preferred weighting versus time characteristic for many types of data collecting systems is the parabolic curve 134 of FIG. 5. The following expression for the transfer admittance of an electrical circuit having an approximation to the parabolic characteristic of FIG. 5 was developed:

$$Y(p) = \frac{1 + \frac{p}{70}}{1 + \frac{18p}{35} + \frac{3p^2}{28} + \frac{41p^3}{4200}} \qquad (7)$$

where $Y(p)$ is the transfer admittance of the electrical network, and $p = i\omega$,
where $i$ is equal to the square root of $-1$, and $\omega$ is the angular frequency.

A network which satisfies the foregoing Expression 7 is shown in FIG. 7. The feedback network including the amplifier 145 is required to avoid the use of inductances, which would be unduly large when smoothing times of ten seconds or longer are used.

The values of the other circuit elements of FIG. 7 are given by the following expressions:

$R_0C_0 = 0.2352T$
$R_1C_0 = k$
$R_1C_1 = 0.2647T$
$R_1C_2 = 5.281T$
$R_2 = 0.001353R_1$ where the resistance elements R are specified in megohms, the capacitance values are in microfarads,
T is the smoothing interval in seconds, and
$k$ is a scale factor having the dimensions of $$\frac{[\text{volt}/(\text{foot}/\text{second})]_{out}}{[\text{volt}/\text{foot}]_{in}}$$

In FIG. 9, the approximation 146 obtained by the use of the circuit of FIG. 7 is compared with the parabolic characteristic 134 taken from FIG. 5. With the use of more complex networks even closer approximations may be obtained.

The relationship between the smoothing circuit 106 in the rocket and the weighting circuit 83 on the ground is determined by the Expression 4 which is set forth hereinabove. The smoothing circuit 106 is shown in FIG. 8. The relatively complicated nature of the circuit, including the two amplifiers 147 and 148, again is a result of the elimination of the inductances which would otherwise be present.

The values of the components of the circuit of FIG. 8 are as follows:

$$R_{10} = \frac{0.590}{k_1}$$

$R_{11} = 1.053R_{10}$
$R_{10}C_{10} = 0.2352T$
$R_{11}C_{11} = 0.0476T$ $$R_{18} = \frac{k}{k_1k_2k_3}$$

$R_{12} = 2.215k_2$
$R_{13} = 0.1384R_{12}$
$R_{14} = 0.03234R_{12}$
$R_{12}C_{12} = 0.840T$ $$R_{15} = \frac{2.460}{k_3}$$

$R_{16} = 0.2450R_{15}$
$R_{17} = 0.3065R_{15}$
$R_{15}C_{13} = 0.1945T$ where the resistances and capacitances are in megohms and microfarads, respectively,
T is the same smoothing time employed in the calculation of the corresponding smoothing circuit of FIG. 7, and
$k_1$, $k_2$, and $k_3$ are arbitrary scale factors having the dimensions of $$\frac{[\text{volt}/(\text{foot}/\text{second})]_{out}}{[\text{volt}/(\text{foot}/\text{second}^2)]_{in}}$$

In FIGS. 5 and 9, the smoothing characteristic $W_r$ is shown at 134 as having a parabolic form. In addition, the characteristic 134 is shown going to zero with a finite slope at both the present time $t$ and at the start of the sampling interval $t-T$. Although this characteristic is shown to be parabolic, it may take other forms which deviate from the parabolic form, and it need not be exactly zero at the beginning and the end of the smoothing interval.

The reason why weighting functions of the general type shown at 134 in FIG. 5 are superior to other known types of smoothing characteristics is as follows. Every weighting characteristic, such as those shown at 133 and 134 in FIG. 5, for example, has a mathematical transform in the frequency domain. The frequency transform of a weighting characteristic is essentially a plot of the transmission characteristic of a corresponding network versus frequency. The amount of suppression of different error frequencies may be determined from the transform. When indicated positions are converted into apparent velocities by a differentiation process with no smoothing, the position versus frequency transform is converted into the velocity versus frequency transform by multiplying by the angular frequency. As a result, the power spectra which correspond to the squares of errors have the following properties. When the power spectrum of position errors is constant with frequency, the power spectrum of velocity with frequency is proportional to the square of the frequency. When smoothing is introduced, the power spectrum of the velocity errors is multiplied by the square of the magnitude of the transform of the weighting characteristic.

With the simpler types of smoothing, such as the memory point smoothing indicated at 133 in FIG. 5, the transform of the weight factor approaches zero at high frequencies as the reciprocal of frequency. The transform of the weight factor of a smoothing circuit made up of a single exponential circuit has the same characteristics. When the transform of the weight factor varies as the reciprocal of frequency, the square of its magnitude varies as the reciprocal of the square of the frequency. When this characteristic is combined with the frequency squared factor corresponding to differentiation, high frequency errors are not actually eliminated.

However, if the weight function is continuous, and approaches zero at each end of the smoothing interval with finite slope, as in plot 134 of FIG. 5, then the square of the magnitude of the transform approaches zero with increasing frequency, in accordance with the reciprocal of the fourth power of the frequency. This more than over-balances the increasing characteristic (in accordance with the second power of the frequency) due to differentiation, and results in the substantial elimination of high frequency errors.

From the foregoing explanation, it is clear that memory point smoothing as indicated by the dashed line plot 133 of FIG. 5 is far inferior to smoothing of the type indicated by the solid line plot 134. In a practical realization of the characteristic 134 of FIG. 5, two or more exponential circuits are normally employed. One such circuit is illustrated in FIG. 7. The resulting circuit may deviate substantially from the parabolic form, and may not be exactly equal to zero at the beginning and the end of the smoothing interval. For example, it may be observed that the plot 146 of FIG. 9 is not quite down to zero at the start of the smoothing interval. It is desirable, however, that the characteristic be moderately close to zero at each end of the smoothing interval, rise to a maximum at some time during the smoothing interval, and not have any substantial discontinuities. While the characteristic may differ from zero at the ends of the smoothing interval, it is not desirable that its value be greater than, for example, one-half of the maximum value of the weighting characteristic, and it should normally not exceed one-quarter of this maximum value.

When the nature of the error versus frequency spectra of the information collection instruments is known, the optimum weighting function W may be determined by a modification of the smoothing and extrapolation theories of Wiener and Kolmogoroff, as described by H. W. Bode and C. E. Shannon in "A Simplified Derivation of Linear Squares Smoothing Theory," Proceedings of the I.R.E. April 1950. For example, with a radar alone, parabolic smoothing is optimum under radar error spectrum conditions described in H. W. Bode Patent 2,492,351. When a radar with these error characteristics is combined with an inertial system such that acceleration errors are constant with respect to time, the optimum weighting characteristic $W_r$ is cubic. The cubic may be either quite close to a parabola in its form or quite different from a parabola, depending on the relative accuracies of the sensing instruments and the length of the smoothing interval. In some cases, the weighting function of the cubic characteristic representing the optimum weighting function may have a loop extending into the negative domain. In the case of a weighting characteristic for an inertial system having errors which are constant, the presence of a negative loop means that at least a portion of the constant errors in acceleration are cancelled out.

The smoothing interval T is an important parameter in the foregoing Expressions 2 and 3, for example, and should be optimized. When the smoothing time T is optimum, the effect of errors in the raw radar and inertial system data on the computed velocity is minimized.

Examining the errors in greater detail, it may be shown that velocity errors due to fluctuating radar errors are as follows:

With memory point smoothing:

$$\sigma_{vr} = \frac{\sigma_x}{T}\sqrt{2} \qquad (8)$$

where $\sigma_{vr}$ represents velocity errors due to radar position errors, $\sigma_x$ is the "standard deviation" in the component of one position measurement in one direction, and T is the duration smoothing interval.

With (parabolic) smoothing of the type shown at 134 in FIG. 5:

$$\sigma_{vr} \cong \frac{\sigma_x}{T}\sqrt{\frac{6}{f_c T}} \qquad (9)$$

where $f_c$ is the cut-off frequency of a flat error spectrum with the same $\sigma_x$ as the fluctuating part of the position errors, and the same spectral density at low frequencies.

A "standard deviation" is a conventional measure of quality. It is the square root of the average square of the errors of the apparatus employed.

With $f_c$ taken equal to one cycle per second, and the smoothing time T being equal to ten seconds or longer, Formula 9 may be conservatively expressed as follows:

$$\sigma_{vr} = \frac{\sigma_x}{T} \qquad (10)$$

Assuming that the inertial system errors are constant and the weight factor $W_r$ is symmetrical, the velocity errors due to inertial system errors are as follows:

$$\sigma_{vi} = \frac{T\sigma_a}{2} \qquad (11)$$

Where $\sigma_a$ is the standard deviation of the component of measured acceleration in one direction.

In the final computed velocity, the radar and inertial system errors combine as follows:

$$\sigma_v = \sqrt{\left(\frac{\sigma_x}{T}\right)^2 + \left(\frac{T\sigma_a}{2}\right)^2} \qquad (12)$$

In the foregoing Expression 12, it may be noted that increasing the smoothing time decreases the contribution of errors from the radar and increases the contribution of errors from the inertial system. The minimum value of $\sigma_v$ is obtained when:

$$T = \sqrt{\frac{2\sigma_x}{\sigma_a}} \qquad (13)$$

This Expression 13 indicates the optimum smoothing period under the assumptions mentioned above. However, it should be noted that the optimum smoothing period is dependent upon the form of the weighting characteristic.

Under these circumstances, the total error is expressed as follows:

$$\sigma_v = \sqrt{\sigma_x \sigma_a} \qquad (14)$$

The minimum value of error obtained with suitable smoothing time turns out to be the mean of the errors from the radar and inertial systems. Thus, the velocity standard deviation in feet per second is simply the mean between the radar standard deviation in feet, and the inertial system standard deviation in feet per second.

The appearance of the square roots in the smoothing time and minimum error Formulae 13 and 14 has an interesting implication. If one of the instrumental accuracies is improved by a factor, the computed velocity is only improved by the square root of that factor. For example, to double the velocity accuracy by improving the inertial system, without changing the radar, the inertial system must be improved by a factor of 4 to 1. Similarly, the smoothing times vary as the square root of either of the separate accuracies.

It is not believed that it had been recognized up to the present time that an optimum smoothing time could be calculated for systems of the present type. Furthermore, the smoothing times which have generally been proposed heretofore have been too short, usually substantially less than ten seconds. With the present relative standard deviations of inertial systems and radar units, it appears that smoothing times of greater than ten seconds are desirable, and longer times such as twenty or thirty seconds may be desirable under some circumstances.

Two factors which contribute to the errors in vector acceleration $\sigma_a^A$ will now be considered. The inertial system in the rocket includes three accelerometers on a stable platform. Errors in the accelerometer indications contribute to the errors in vector acceleration mentioned above; errors in the orientation of the stable platform also make a contribution. In the rocket, the vector velocity information provided by the radar system is corrected by combining it with vector velocity data from the inertial system. Therefore, the direction of acceleration is as important as its magnitude.

The errors due to the accelerometers are independent errors which may be designated "$\sigma_a$" in three directions. The errors in vector acceleration resulting from errors in the position of the stable platform may be explained by reference to FIG. 10. In FIG. 10, the vector 141 represents the vector acceleration $a$ observed by the misaligned inertial system and the vector 142 represents the true vector acceleration. The angle 143, designated $\sigma_d$, between vectors 141 and 142, is the error in the platform angle.

Accordingly, very little or no error is introduced into the vector acceleration along the principal direction of acceleration by slight platform errors. In the yaw and pitch directions, perpendicular to the acceleration vector 142, however, an error in platform orientation introduces an error proportional to the product of the acceleration and the angle of error in platform orientation.

The errors in vector velocity resulting from platform and accelerometer errors will be as follows:

(1) Along the principal direction of vector acceleration $$\sigma_a^A = \sigma_a \qquad (15)$$

(2) Across vector acceleration:

$$\sigma_a^A \sqrt{\sigma a^2 + a^2 \sigma_d^2} \qquad (16)$$

The presence of the term $a^2 \sigma_d^2$ in the foregoing Expression 16 shows that the velocity errors are strongly dependent on the acceleration of the rocket. Accordingly, these errors may be greatly reduced by reducing the rocket thrust during a portion of the rocket trajectory immediately preceding complete power cut-off. This portion of the rocket trajectory shown in FIG. 2 between points 58 and 55 is termed the vernier phase. At the beginning of this portion of the trajectory, the thrust is reduced from about 10 G to approximately ½ G where 1 G is the acceleration of gravity at sea level. This greatly reduces the velocity errors by reducing the factor $a$ in Formula 16. The accelerometers employed to measure the acceleration during the vernier stage may also be more sensitive (in view of the reduced full scale reading), and therefore have less absolute error.

Another important factor in the accuracy of the present rocket system will now be considered. As mentioned above, it is considered desirable to locate the tracking radar system at the missile launching site. In the present specification and claims, it is to be understood that the phase "at the launching site" means that the tracking system is located less than 5 or 10 miles from the launching site. The location of the radar system at the launching site raises certain problems involving the missile trajectory. Specifically, when range and angle errors are compared on the basis of corresponding vector errors in vector position, radar systems are normally more accurate in determining range than in determining deflection angles. Similarly, there are some directions of vector velocity of the rocket which affect the impact point error only slightly, while variations in vector velocity in other directions yield large impact point errors. That direction which gives the greatest impact point error will be called the "high impact point sensitivity direction" of the rocket.

In FIG. 11A, the vector 115 indicates the actual missile vector velocity, while the vector 116 indicates the correct vector velocity for zero impact point error. Therefore, the vector 117 indicates the vector velocity error. In FIG. 11B, the correct vector velocity is again designated 116, and the vector error 118 is aligned with vector 116 and adds thereto. The range is accordingly increased. In FIG. 11C, the vector velocity error 119 is aligned with and opposes the correct velocity vector 116, and therefore decreases the range. In FIG. 11D, the velocity vectors 121 and 122 represent velocity errors in two directions between vectors 118 and 119 shown in FIGS. 11B and 11C, respectively, which result in no change in the range. The foregoing explanation of the vector diagrams of FIGS. 11A through 11D is intended to give a physical picture of the mathematical fact stated above, i.e., that vector velocity errors in some directions yield much smaller impact point errors than vector velocity errors in other directions.

Figure 12:
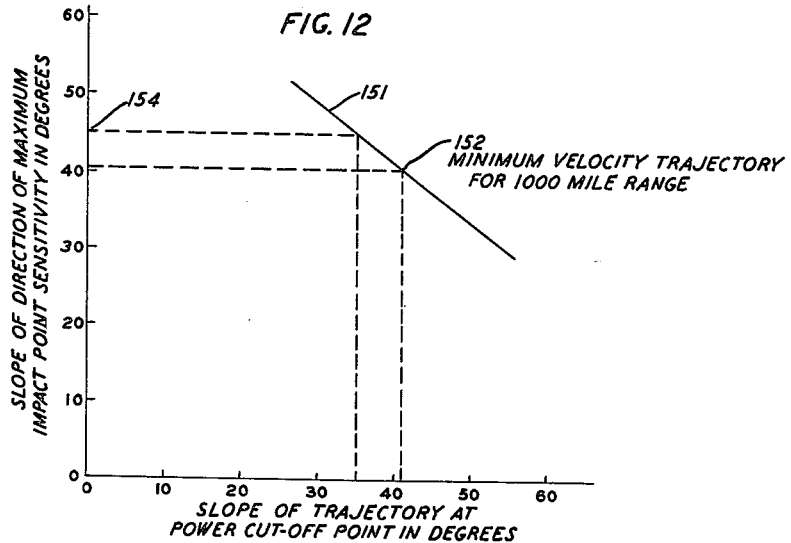
FIG. 12 is the plot of the maximum impact point sensitivity direction as a function of trajectory slope.

In FIG. 12, the line 151 represents the direction of maximum impact point sensitivity plotted against the slope of the trajectory in degrees at the power cut-off point for a number of different rocket trajectories, all of which have a target range of 1,000 miles. At this range, the minimum velocity trajectory is 41 degrees, as indicated at point 152 on curve 151. As expected, the direction of maximum impact point sensitivity is also 41 degrees, and is thus tangent to the trajectory at the power cut-off point. In FIG. 2, a tangent 125 has been drawn to the rocket trajectory at the power cut-off point 55. This intersects the surface of the earth 52 at a point 126, which is many miles from the launching site 53 of the rocket.

Figure 13:
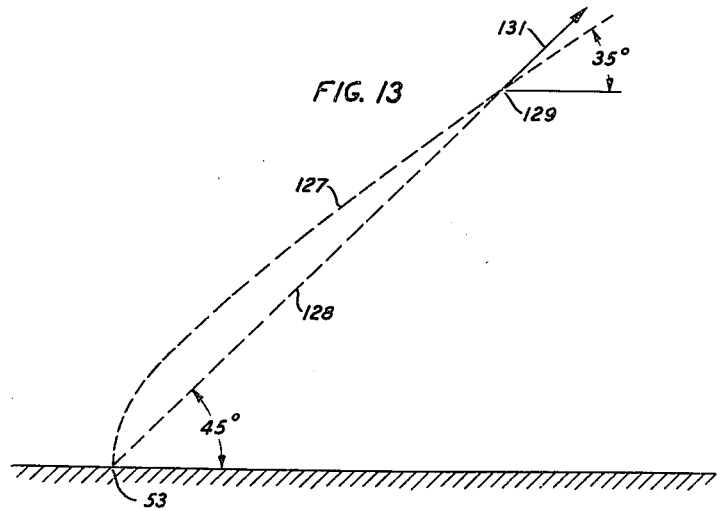
FIG. 13 is a plot of a trajectory which may be employed in accordance with one aspect of the present invention.

However, as may be observed in FIG. 12, a slightly flatter trajectory such as 35 degrees, for example, yields a substantially steeper angle of maximum impact point sensitivity. In FIG. 13, such a flattened trajectory is shown at 127 together with the line of sight 128 from the radar system at point 53 to the power cut-off point 129. As indicated in FIG. 13, the slope of the trajectory 127 at the power cut-off point is 35 degrees, and the line of sight from the rocket launching point to the power cut-off point in the rocket trajectory is 45 degrees. The direction of maximum impact point sensitivity is shown by the vector 131 in FIG. 13. As indicated at point 154 in FIG. 12, this vector 131 is also oriented at 45 degrees with respect to the horizontal. Accordingly, the line of sight 128 from the radar unit to the rocket is colinear with the direction 131 of maximum impact point sensitivity. The most accurate direction of velocity determination of the radar set is now aligned with the high impact point sensitivity direction of the rocket, and optimum usefulness of the equipment is therefore obtained.

The present guidance system has been disclosed in the proceding detailed description in terms of its application to a long range ballistic missile. However, many of the principles of the present guidance system are equally applicable to the control of other self-propelled craft, such as rocketships, for specific example. As in the case of ballistic missiles, it will often be very important that rocketships follow a carefully guided initial trajectory. In the establishment and maintenance of an artfiicial satellite rotating about the earth, for example, accurate control of rocketships will be required in their paths from the earth to the orbit of the satellite. The techniques of data processing and utilization of information collection equipment disclosed hereinabove could also be used in many other circumstances where similar guidance problems are presented.

It is to be understood that the above-described arrangements are illustrative of the application of the principles of the invention. Numerous other arrangements may be devised by those skilled in the art without departing from the spirit and scope of the invention.

What is claimed is:

1. In a control system for guiding a rocket from a rocket launching site toward a remote target, a rocket, means for launching said rocket located at said site, radar means located at said launching site for tracking said rocket and developing information signals representing the position of said rocket, an intertial system in said rocket for providing information signals representing the vector acceleration of said rocket, means including a computer for combining the information from said radar means and from said inertial system and providing mathematically smoothed indications of the rocket velocity and position, and control means for making the rocket-to-radar line of sight substantially colinear with the direction of greatest impact point sensitvity of the rocket at the point in the rocket trajectory where ground to air control is terminated.

2. A combination as set forth in claim 1 wherein said computer includes means for computing the smoothed value of velocity according to formula $$V(t)=\int_{t-T}^{t}\left[W\frac{(dx\tau)}{d\tau}-\left(1-\int_{\tau}^{t}Wd\tau_1\right)a(\tau)\right]d\tau$$

wherein $x$ is one component of position supplied by the radar on the ground,
$a$ is the corresponding component of acceleration supplied by the inertial system in the missile,
$t$ is "present time,"
$\tau$ is the time of observation of $x$ and $a$,
$\tau_1$ is the variable of integration of the inner integral,
$T$ is the length of the smoothing period, and
$W$ is the smoothing weight factor.

3. A combination as set forth in claim 1 wherein the computer includes means for calculating the rocket vector velocity from said radar information, said last-mentioned means including weighting circuit means having substantially parabolic smoothing.

4. In a control system for guiding a rocket from a rocket launching site toward a remote target, means for launching said rocket located at said site, radar means for tracking said rocket located at said site, means for controlling the path of said rocket up to a predetermined ground to air control cut-off point in the rocket trajectory, said last-mentioned means including trajectory computer means for determining a trajectory for said rocket which is slightly flattened as compared with the minimum velocity free flight trajectory and for making the rocket-to-radar line of sight direction substantially coincident with the direction of greatest impact point sensitivity of the rocket at said ground to air control cut-off point.

5. In a system for guiding a rocket along a predetermined trajectory, a rocket, means for launching said rocket, means for tracking said rocket and providing output tracking data, an inertial system in said rocket for providing data indicating the acceleration of said rocket, means for computing the rocket velocity from data supplied by said tracking means and said inertial system, said computing means including weighting circuit means for applying substantially parabolic smoothing to the tracking data, and control means for guiding said rocket along said predetermined trajectory in accordance with said computed velocity and position.

6. In a rocket control system, a rocket, a radar system on the ground for providing data indicating the position of said rocket, an inertial system in the rocket for providing data indicating the acceleration of said rocket, and means including a computer system for combining the data from said radar and inertial systems to obtain a mathematically smoothed indication of the velocity of said rocket, said computer system including means for weighting the data from said radar system in accordance with a function which varies from substantially zero at the start of a sampling interval through a maximum to substantially zero at the moment at which the computation occurs, and means for controlling the velocity of said rocket in accordance with the output of said computer system.

7. A system as defined in claim 6 wherein said rocket control means includes means for substantially reducing the thrust of the power plant of said rocket during a final vernier power phase of said rocket.

8. A system as defined in claim 6 wherein the velocity is determined by the expression $$V(t)=\int_{t-T}^{t}\left[W\frac{dx(\tau)}{d\tau}-\left(1-\int_{\tau}^{t}Wd\tau_1\right)a(\tau)\right]d\tau$$

wherein $x$ is one component of position supplied by the radar on the ground,
$a$ is the corresponding component of acceleration supplied by the inertial system in the missile,
$t$ is "present time,"
$T$ is the length of the smoothing period,
$\tau$ is the time of observation of $x$ and $a$,
$\tau_1$ is the variable of integration of the inner integral, and
$W$ is the smoothing weight factor.

9. In a rocket control system, a rocket, a radar system on the ground for providing data indicating the position of said rocket, an inertial system in the rocket for providing data indicating the acceleration of said rocket, and means including a computer system for combining the data from said radar and inertial systems to obtain a mathematically smoothed indication of the velocity of said rocket, said computer system including means for weighting said velocity data in accordance with a plurality of exponential functions, and means for controlling the velocity of said rocket in accordance with the output of said computer system.

10. In a rocket control system, a rocket, a radar system on the ground for providing data indicating the position of said rocket, an inertial system in the rocket for providing data indicating the acceleration of said rocket, and means including a computer system for combining the data from said radar and inertial systems to obtain a mathematically smoothed indication of the velocity of said rocket, said computer system including means for weighting the velocity data derived from the radar system in accordance with a function which varies from substantially zero at the start of a time interval through a maximum to substantially zero at the moment at which the computation occurs, and means for controlling the velocity of said rocket in accordance with the output of said computer system.

11. In a system for measuring velocity of a self-propelled moving body, a tracking system on the ground for providing data indicating the position of said rocket, an inertial system in the moving body for providing data indicating the acceleration of said body, means including a computer system for combining the data from said tracking and inertial systems to obtain a mathematically smoothed indication of the velocity of said moving body, said computer system including means for weighting the velocity data derived from said tracking system in accordance with a function which varies from substantially zero at the start of a smoothing interval through a maximum to substantially zero at the moment at which the computation occurs, and means for controlling the velocity of said moving body in accordance with the output of said computer system.

12. In a system for measuring velocity of a moving body, a radar system on the ground for providing data indicating the position of said body, an inertial system in the moving body for providing data indicating the acceleration of said body, means including a computer system for combining the data from said radar and inertial systems to obtain a mathematically smoothed indication of the velocity of said moving body, said computer system including means for weighting the velocity data derived from said radar system in accordance with a function which varies from substantially zero at the start of a sampling interval through a maximum to substantially zero at the moment at which the computation occurs.

13. In a system for controlling the velocity of a moving body, a tracking system on the ground for providing data indicating the position of said body, an inertial system in the moving body for providing data indicating the acceleration of said body, means including a computer system for combining the data from said tracking and inertial systems to obtain a mathematically smoothed indication of the present velocity of said moving body, said computer system including means for weighting the velocity data derived from said tracking system in accordance with a function which varies from a predetermined value at the start of a smoothing interval through a maximum to a second predetermined value at the moment at which the computation occurs, said predetermined values both being less than one-half said maximum value, and means for controlling the velocity of said moving body in accordance with the output of said computer system.

14. A system as defined in claim 13 wherein said smoothing interval is longer than ten seconds.

15. A system as defined in claim 13 wherein the length of said smoothing interval is determined by the following expression:

$$T = \sqrt{\frac{2\sigma_x}{\sigma_a}}$$

where T is the smoothing interval, $\sigma_x$ is the standard deviation of a component of position measurement, and $\sigma_a$ is the standard deviation of a component of measured acceleration in one direction.

16. In a system for controlling the velocity of a rocket, a tracking system on the ground for providing data indicating the position of said rocket, an inertial system in the rocket for providing data indicating the acceleration of said rocket, means including a computer system for combining the data from said tracking and inertial systems to obtain a mathematically smoothed indication of the present velocity of said rocket, said computer system including means for weighting the velocity data derived from said tracking system in accordance with a function which varies from a predetermined value at the start of a smoothing interval through a maximum to a second predetermined value at the moment at which the computation occurs, said predetermined values both being less than one-half said maximum value, and means for controlling the velocity of said rocket in accordance with the output of said computer system.

17. A system as defined in claim 16 wherein said rocket control means includes means for substantially reducing the thrust of the power plant of said rocket during a final vernier power phase of said rocket.

18. In a system for controlling the velocity of a self-propelled moving body, a tracking system on the ground for providing tracking information, means for providing information indicating the acceleration of the moving body located in the moving body, means including a computer system for combining information from the tracking system and the acceleration indicating means to obtain a mathematically smoothed indication of the present velocity of the moving body, said computer system including means for weighting the velocity data derived from said tracking system in accordance with a function which varies from a predetermined value at the start of a smoothing interval through a maximum to a second predetermined value at the present time, said predetermined values both being less than one-half said maximum value, and means for controlling the velocity of said moving body in accordance with the output of said computer system.

19. In combination, a self-propelled ballistic missile, means for launching said missile, means for tracking said missile and provided tracking information, computer means for determining the correct position and velocity of said missile and the errors in position and velocity with respect to the computed correct position and velocity from said tracking information, and control means responsive to the errors determined by said computer means for substantially aligning the direction of greatest impact point sensitivity of the missile with the line of sight from the tracking system to the missile at the ground to air control cut-off point in the missile trajectory.

No references cited.